E. H. HAMILTON.
METHOD OF REDUCING LEAD ORES.
APPLICATION FILED JULY 2, 1919.
1,404,714.
Patented Jan. 24, 1922.
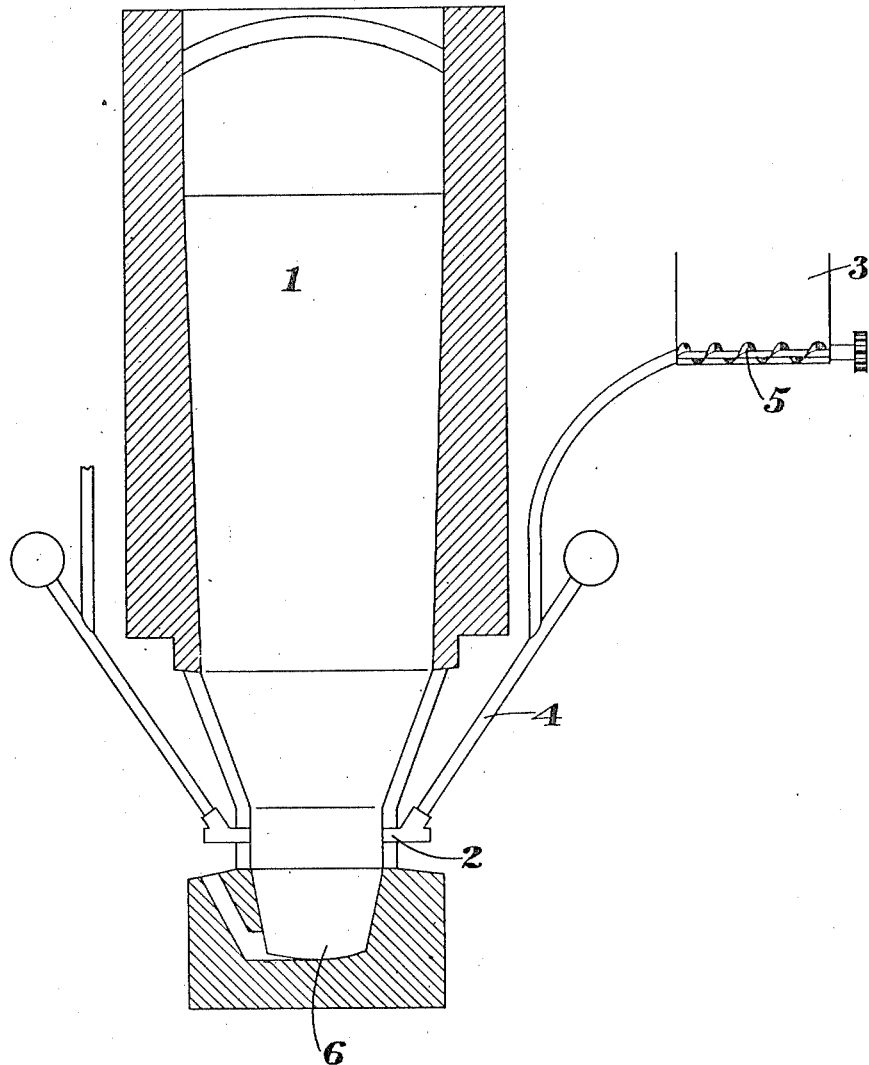
Witness
Robert C. Boone
Inventor
Edward H. Hamilton
Van Evern Fish & Hildreth
Attys

UNITED STATES PATENT OFFICE.

EDWARD H. HAMILTON, OF MIDVALE, UTAH, ASSIGNOR TO UNITED STATES SMELTING, REFINING & MINING COMPANY, A CORPORATION OF MAINE.

METHOD OF REDUCING LEAD ORES.

1,404,714.   Specification of Letters Patent.   Patented Jan. 24, 1922.

Application filed July 2, 1919. Serial No. 308,159.

*To all whom it may concern:*

Be it known that I, EDWARD H. HAMILTON, a citizen of the United States, residing at Midvale, in the county of Salt Lake and State of Utah, have invented certain new and useful Improvements in Methods of Reducing Lead Ores; and I do hereby declare the following to be a full, clear, and exact description of the invention, such as will enable others skilled in the art to which it appertains to make and use the same.

The present invention relates to processes for reducing lead ores.

It is customary, in lead-reducing operations, to introduce the fuel with the charge of ore and flux at the top of the blast furnace. Successive charges are thus periodically introduced, the fuel becoming gradually consumed in the course of its progress towards the bottom of the furnace, melting the ore and causing it to fuse with the flux. From the time that the charge is first introduced until the melted metal reaches the well at the bottom of the furnace, there is usually a lapse of from four to twelve hours, during which period of time, the smelting operation is completely beyond the control of the operator. If the ingredients of the charge have not been accurately proportioned or properly and uniformly prepared and distributed, there is no way of rectifying the error, and maintaining or restoring the proper and uniform smelting conditions throughout the smelting zone. This is a serious defect in connection with the operation of smelting lead which requires that uniform, definite conditions be closely approximated in order to successfully and economically reduce and recover the molten lead.

The object of the present invention is to remedy this defect and also to improve the conditions at the smelting zone as well as to reduce the cost of the operation by utilizing a cheaper form of fuel.

With these objects in view, the invention consists of the improved process of reducing lead ore hereinafter described and more particularly defined in the claims.

The accompanying drawing is a diagrammatic view of a blast furnace constructed and arranged for the carrying out of the present invention.

In accordance with the present invention, the ore, together with a suitable proportion of a silica or a limestone, iron, or other flux is introduced at the top of the furnace 1. Carbonaceous fuel, such as powdered coal, is fed in finely-divided form from hoppers 3 to the twyer pipes 4, where it meets an incoming blast of air with which it mingles and by which it is carried through the twyers 2 into the furnace.

The fuel mingled with the air is thus introduced into the furnace just below or at the smelting zone where it (or the major part of it) immediately unites with the oxygen of the air to furnish in connection with that part of the fuel which is introduced with the charge the heat requisite for melting the ingredients of the charge and the carbon monoxide for reducing the molten ore to the metalic state. The heat and reducing atmosphere may thus be localized where they will act most efficiently, with a resulting economy of fuel and increase in the rapidity of the smelting operation. The amount of fuel admitted may be accurately regulated to unite with all the free oxygen in the air, thus avoiding the presence of free oxygen in the smelting zone and the resulting undesirable reoxidization of reduced metal. The introduction of the fuel with the air blast also enables the temperature at the smelting zone to be accurately regulated and uniformly maintained at the comparatively low temperature requisite for the smelting of lead without objectionable volatilization and loss. In smelting ores containing arsenic and antimony or similar metals, the temperature may be readily regulated to drive off the arsenic with the furnace gases without volatilization and loss of the antimony or other valuable metal.

The introduction of the fuel with the air also enables the temperature and reducing conditions to be varied in different parts of the smelting zone to compensate for any errors or unavoidable variation in the character or proportions of the charge at different points and to maintain a substantially uniform smelting operation throughout the zone.

The supply of air to the different twyers may be regulated in the usual way, and a regulated feed of the fuel to each twyer may be secured in any suitable manner, as by the provision of a feed screw 5 in each hopper, the speed of which may be independently regulated by the attendant.

What is claimed is:

1. The process of reducing lead ores in a blast furnace which comprises introducing with the air blast through the tuyères of the furnace finely divided carbonaceous fuel in quantities regulated to combine with the oxygen of the blast to supply a material part of the carbon monoxide as well as a material part of the heat requisite for melting and reducing the ore.

2. The process of reducing lead ores in a blast furnace which comprises introducing with the air blast into the charge at or below the smelting zone finely divided carbonaceous fuel in quantities sufficient to localize the heat and to also furnish a material part of the carbon monoxide for reducing the lead oxides.

EDWARD H. HAMILTON.